US008937144B2

(12) United States Patent
Saegusa et al.

(10) Patent No.: US 8,937,144 B2
(45) Date of Patent: Jan. 20, 2015

(54) ELASTIC MEMBER, PROCESS CARTRIDGE AND IMAGE FORMING APPARATUS

(71) Applicant: Fuji Xerox Co., Ltd., Tokyo (JP)

(72) Inventors: Hiroshi Saegusa, Kanagawa (JP); Tomoko Miyahara, Kanagawa (JP); Hisae Yoshizawa, Kanagawa (JP); Kaoru Torikoshi, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 13/792,963

(22) Filed: Mar. 11, 2013

(65) Prior Publication Data

US 2013/0245195 A1 Sep. 19, 2013

(30) Foreign Application Priority Data

Mar. 14, 2012 (JP) ................................ 2012-056812

(51) Int. Cl.
*C08G 77/385* (2006.01)
*G03G 11/00* (2006.01)
*G03G 15/20* (2006.01)

(52) U.S. Cl.
CPC ............ *G03G 11/00* (2013.01); *G03G 15/2057* (2013.01)
USPC ............................................... 528/42; 528/34

(58) Field of Classification Search
CPC ............ G03G 2215/2051; C08G 77/16; C07F 7/1812
USPC ..................................................... 528/34, 42
See application file for complete search history.

(56) References Cited

U.S. PATENT DOCUMENTS

| | | | | |
|---|---|---|---|---|
| 4,264,181 | A | 4/1981 | Lentz et al. | |
| 2002/0012550 | A1 | 1/2002 | Nakano | |
| 2008/0090004 | A1 * | 4/2008 | Zhang et al. | 427/180 |
| 2013/0227755 | A1 * | 9/2013 | Bisaillon | 2/20 |

FOREIGN PATENT DOCUMENTS

| | | |
|---|---|---|
| JP | A-55-135876 | 10/1980 |
| JP | A-10-142990 | 5/1998 |
| JP | A-10-204224 | 8/1998 |
| JP | A-2001-183935 | 7/2001 |

* cited by examiner

*Primary Examiner* — Kuo-Liang Peng
(74) *Attorney, Agent, or Firm* — Oliff PLC

(57) ABSTRACT

There is provided an elastic member including a surface resin layer including a crosslinked product of a dimethyl silicone compound having a reactive group and a fluoroalkyl compound having a reactive group.

6 Claims, 1 Drawing Sheet

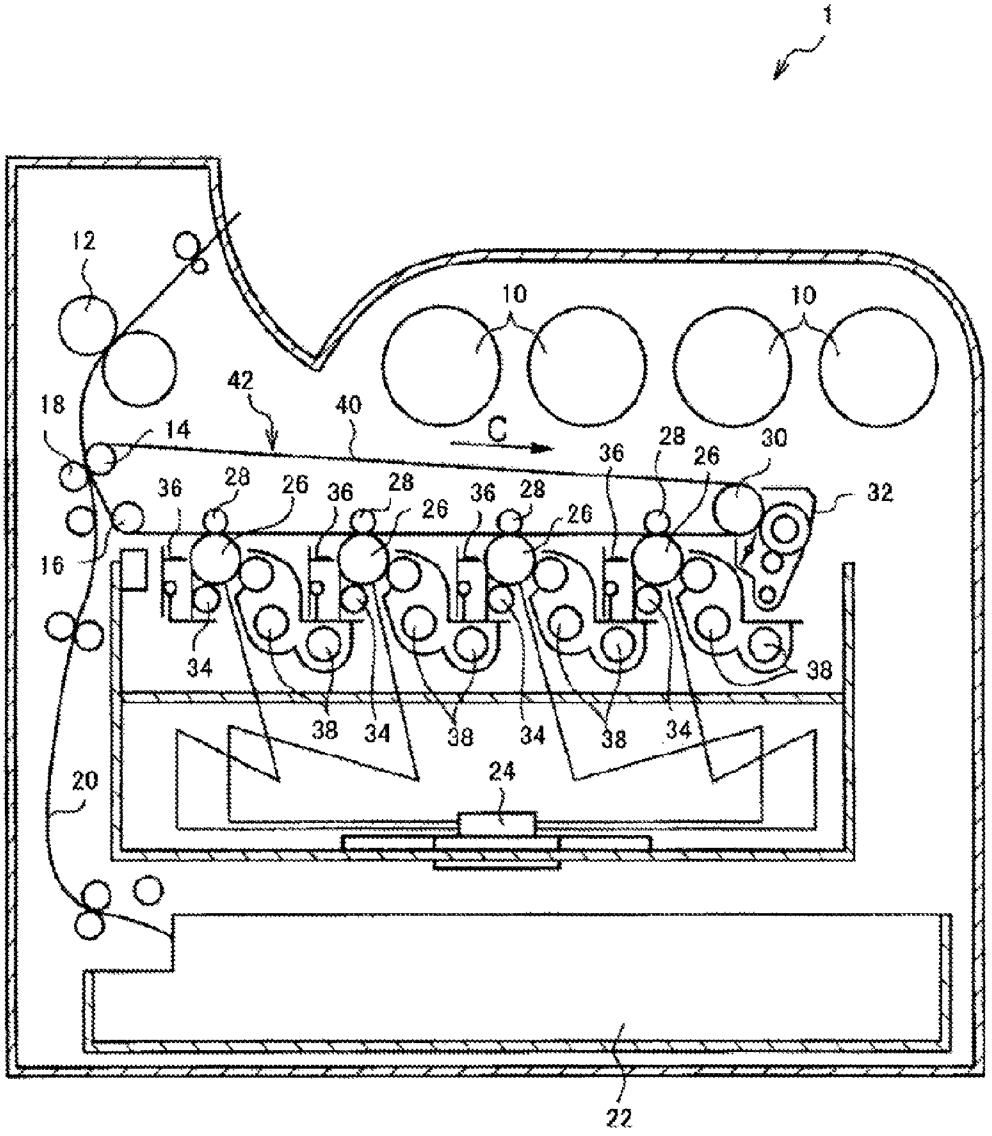
1
10
10
12
42
40
C
18
14
36
28
26
30
32
16
34
38
20
24
22

ELASTIC MEMBER, PROCESS CARTRIDGE AND IMAGE FORMING APPARATUS

CROSS-REFERENCE TO RELATED APPLICATION(S)

This application is based on and claims priority under 35 U.S.C. 119 from Japanese Patent Application No. 2012-056812 filed on Mar. 14, 2012.

BACKGROUND

1. Technical Field

The present invention relates to an elastic member, a process cartridge, and an image forming apparatus.

2. Related Art

For example, JP-A-10-142990 discloses a fixing roller produced by forming a fluororesin mixture containing tetrafluorethylene-perfluoroalkyl vinyl ether copolymer (PEA) and polytetrafluoroethylene (PTFE) on an outer surface of a roller-shaped base material.

JP-A-2001-183935 discloses a fixing roller having a cored bar, a primer layer coated on an outer circumference of the cored bar, and a fluororesin top layer coated on an outer circumference of the primer layer, in which glass particles are incorporated in at least one of the primer layer and the top layer.

JP-A-55-135876 discloses a fixing member in which fluorine rubber is used as an elastic body.

JP-A-10-204224 discloses a fixing roller in which a composition obtained by mixing fluoroalkylsilane with a heat-resistant elastomer, such as fluorine rubber, is used.

In addition, a variety of methods are employed as a transcription method for transcribing toner images, and known examples thereof include a corotron discharge method, a contact transcription method, and the like. Regarding the contact transcription method, the development of a method, in which an elastic member, such as a conductive roller or belt made of polyurethane, in which conductive particles, such as carbon, are dispersed, is used, is underway.

An object of the invention is to provide an elastic member having an excellent mold release property, a process cartridge and an image forming apparatus having the elastic member.

SUMMARY (1) An elastic member including a surface resin layer including a crosslinked product of a dimethyl silicone compound having a reactive group and a fluoroalkyl compound having a reactive group.

BRIEF DESCRIPTION OF DRAWINGS

Exemplary embodiment of the present invention will be described in detail based on the following FIGURE, wherein:

FIG. 1 is a schematic configuration view illustrating an example of an image forming apparatus according to an exemplary embodiment of the invention.

DETAILED DESCRIPTION

An exemplary embodiment of the invention will be described below. The present exemplary embodiment is an example for carrying out the invention, and the invention is not limited to the embodiment.

<Elastic Member>

An elastic member according to the exemplary embodiment of the invention has a resin layer including a crosslinked product of a dimethyl silicone compound having a reactive group and a fluoroalkyl compound having a reactive group. The elastic member according to the embodiment, in general, has the resin layer on a base material as a surface layer.

In the embodiment, when a crosslinked product of a dimethyl silicone compound having a reactive group and a fluoroalkyl compound having a reactive group is used for the resin layer, since the resin layer contains fluorine atoms and silicon atoms, an elastic member having an excellent mold release property is obtained. In addition, when the resin layer has an appropriate degree of elasticity, favorable toner fixing property, transcribing property, and the like are realized even when significantly uneven special paper, such as embossed paper, is used. Furthermore, when a dimethyl silicone compound is used, the compatibility with a fluoroalkyl compound having a reactive group becomes favorable in a composition which has not yet undergone a crosslinking reaction. It is considered that, in the crosslinked product, the dimethyl silicone portion contributes to elasticity and affinity to a mold release agent and the like of a toner, and the fluoroalkyl portion contributes to a mold release property with paper and a toner.

Examples of the dimethyl silicone compound having a reactive group include straight-chain or branched-chain dimethyl silicone compounds having a reactive group, such as a hydroxyl group, an alkoxy group, a vinyl group, an H group (hydrogen atom), a thiol group, an epoxy group, a carboxyl group and an amino group. Examples of the alkoxy group include straight-chain or branched-chain alkoxy groups having from 1 to 10 carbon atoms, such as a methoxy group or an ethoxy group. The dimethyl silicone compound having a reactive group may be used solely or in combination of two or more kinds. In addition, when a straight-chain dimethyl silicone compound having a reactive group and a branched-chain dimethyl silicone compound having a reactive group are jointly used, a network structure is formed, the strength of the crosslinked product improves, and the durability improves.

Examples of the straight-chain dimethyl silicone compound having a reactive group include compounds having a structure represented by the following general formula (1). The number average molecular weight of the dimethyl silicone compound is, for example, from 250 to 100,000, and may be from 500 to 50,000, (1)

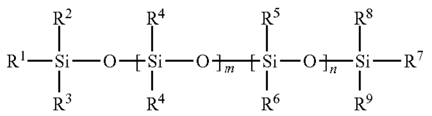

in the general formula (1), $R^1$, $R^2$, $R^3$, $R^5$, $R^6$, $R^7$, $R^8$ and $R^9$ represent a hydrogen atom, an alkyl group, a phenyl group, a vinyl group, a carboxyl group, a thiol group, an amino group, a hydroxyl group, an alkoxy group, an alkyl amino group, an alkyl hydroxyl group, an alkyl alkoxy group, an alkyl methacrylate or an alkyl acrylate, which has from 1 to 10 carbon atoms, $R^4$ represents a methyl group or an ethyl group, m represents an integer of 1 or more, and n represents an integer of 0 or more, $R^1$, $R^2$, $R^3$, $R^5$, $R^6$, $R^7$, $R^8$ and $R^9$ may be the same or different.

Examples of the branched-chain dimethyl silicone compound having a reactive group include compounds having a structure represented by the following general formula (2).

$$[(R^{10})_x\text{—}Si(R^{11})_y(O)_{(4-x-y)}\text{]}_z\text{—} \quad (2)$$

In the general formula (2), $R^{10}$ represents a methyl group or an ethyl group, and $R^{11}$ represents a vinyl group, a carboxyl group, a thiol group, an amino group, a hydroxyl group, an alkoxy group, an alkyl amino group, an alkyl hydroxyl group, an alkyl alkoxy group, an alkyl methacrylate or an alkyl acrylate. x represents an integer of 0 to 2, y represents an integer of 1 to 3, x+y is less than 4, and z represents an integer of 3 or more.

Examples of commercially available products of the dimethyl silicone compound having a reactive group, which can be procured, include YF3905, YF3804, YF3057, YF3807, XC96-723, XC96-C2813 (all manufactured by Momentive Performance materials Inc.), KF9701, KF8008, KF8010, KF6001 (all manufactured by Shin-Etsu Chemical Co., Ltd.), HMS-301, HMS-151, HMS-501, HMS-082, DMS-H21, DMS-H25, DMS-H31 (all manufactured by AZmax) and the like, which are straight-chain dimethyl silicone compounds having a reactive group at the terminal, XC96-B0446, XC31-B1410, XR31-B2733 (all manufactured by Momentive Performance materials Inc.), which are branched-chain dimethyl silicone compounds having a reactive group at the terminal, VDT-731, VDT-431, VDT-163, DMS-V25, DMS-V31, DMS-V33, DMS-V35, DMS-V41, DMS-V42 (all manufactured by AZmax) and the like, which are straight-chain dimethyl silicone compounds having a vinyl group at the side chain.

As the dimethyl silicone compound having a reactive group, the joint use of a straight-chain dimethyl silicone compound having a reactive group and a branched-chain dimethyl silicone compound having a reactive group is preferable. For example, when a straight-chain dimethyl silicone compound having a reactive group, such as a hydroxyl group, at the terminal and a branched-chain dimethyl silicone compound having a reactive group, such as an alkoxy group, at the terminal are jointly used, a network structure is formed, the strength of the crosslinked product improves, and the durability improves. In addition, for example, when a straight-chain dimethyl silicone compound having an group at the terminal and a straight-chain dimethyl silicone compound having a vinyl group at the side chain are jointly used, a network structure is formed, the strength of the crosslinked product improves, and the durability improves.

The ratio between the straight-chain dimethyl silicone compound and the branched-chain dimethyl silicone compound in the crosslinked product is, for example, in a range of from 95:5 to 10:90 by molar ratio, and is preferably in a range of from 90:10 to 60:40.

The ratio between the straight-chain dimethyl silicone compound having an 1.1 group at the terminal and the straight-chain dimethyl silicone compound having a vinyl group at the side chain in the crosslinked product is, for example, in a range of from 95:5 to 10:90 by molar ratio, and is preferably in a range of from 90:10 to 60:40.

Examples of the fluoroalkyl compound having a reactive group include compounds having a structure represented by the following general formula (3).

$$F_3C\text{—}(CF_2)_o\text{—}(CH_2)_p\text{—}Y \quad (3)$$

In the general formula (3). Y represents an alkyl vinyl group which may have an ester bond, an ether bond, a thio ester bond, a thin ether bond, an amide bond, an amino bond or a urethane bond, an alkoxysilyl group which may have an alkyl group, a halogenated silyl group which may have an alkyl group, an isocyanate group, a hydroxyl group or a thiol group, o represents an integer of from 1 to 10, and p represents an integer of from 0 to 10.

Specific examples of the fluoroalkylsilane compound include $CF_3(CF_2)_5CH_2Si(OCH_3)_3$, $CF_3(CF_2)_5CH_2CH_2SiCH_3(OCH_3)_2$, $CF_3(CF_2)_5CH_2CH_2Si(CH_3)_2(OCH_3)$, $CF_3(CF_2)_3CH_2CH_2Si(OCH_3)_3$, $CF_3(CF_2)_3CH_2CH_2SiCH_3(OCH_3)_2$, $CF_3(CF_2)_3CH_2CH_2Si(CH_3)_2(OCH_3)$, $CF_3(CF_2)_5CH_2CH_2SiCl_3$, $CF_3(CF_2)_5CH_2CH_2Si(CH_3)Cl_2$, $CF_3(CF_2)_5CH_2CH_2Si(CH_3)_2Cl$, $CF_3(CF_2)_3CH_2CH_2SiCl_3$, $CF_3(CF_2)_3CH_2CH_2Si(CH_3)Cl_2$, $CF_3(CF_2)_3CH_2CH_2Si(CH_3)_2Cl$, and the like.

Specific examples of the fluoroalkyl vinyl compound include 2-(perfluorohexyl)ethyl acrylate, 2-(perfluorohexyl) ethylmethacrylate, perfluorohexyl ethylene, perfluorohexyl vinyl ether, perfluorohexyl ethanol, 2-(perfluorobutyl)ethyl acrylate, 2-(perfluorobutyl)ethyl methacrylate, perfluorobutyl ethylene, perfluorobutyl vinyl ether, perfluorobutyl ethanol, 2-(perfluoropropyl)ethyl acrylate, 2-(perfluoropropyl) ethyl methacrylate, perfluoropropyl ethylene, perfluoropropyl vinyl ether, perfluoropropyl ethanol, hexafluoroisopropyl acrylate, hexafluoroisopropyl methacrylate, hexafluoroisopropanol and the like.

Among the fluoroalkyl compounds having a reactive group, any one may be used, or two may be jointly used. In addition, the fluoroalkylsilane compound may be used solely or in combination of two or more kinds. The fluoroalkyl acrylate compound may be used solely or in combination of two or more kinds.

The ratio between the dimethyl silicone compound having a reactive group and the fluoroalkyl compound having a reactive group in the crosslinked product is, for example, in a range of from 95:5 to 50:50 by molar ratio, and is preferably in a range of from 90:10 to 60:40. When the ratio is less than 95:5, there are cases in which it becomes difficult to maintain the mold release property, and, when the ratio exceeds 50:50, there are cases in which the initial mold release property deteriorates.

The resin layer is formed by coating the dimethyl silicone compound having a reactive group, the fluoroalkyl compound having a reactive group, and a composition including a catalyst as necessary on a base material so as to form a coated film, heating and curing the coated film. For example, an addition reaction makes crosslinking proceed between the straight-chain dimethyl silicone compound having a reactive group, such as a hydroxyl group, at the terminal and the branched-chain dimethyl silicone compound having a reactive group, such as an alkoxy group, at the terminal, thereby forming a network structure, and a condensation reaction makes crosslinking proceed between the straight-chain dimethyl silicone compound having an H group at the terminal and the straight-chain dimethyl silicone compound having a vinyl group at the side chain, thereby forming a network structure. In addition, an addition reaction makes crosslinking proceed between the dimethyl silicone compound having a reactive group, such as a hydroxyl group or an alkoxy group, and the fluoroalkylsilane compound, and a copolymerization reaction makes crosslinking proceed between the dimethyl silicone compound having a reactive group, such as a vinyl group, and at least one of the fluoroalkyl acrylate compounds.

Examples of the catalyst include organic metal compounds of platinum, aluminum, titanium, zirconium, tin and the like; organic acids, such as formic acid, acetic acid, oxalic acid, citric acid, trifluoro acetic acid, trifluoroacetic acid, paratoluene sulfonic acid, chloric acid, sulfuric acid and phosphoric acid; and the like. The amount of the catalyst being used may be, for example, in a range of from 0.1 mass % to 20 mass % with respect to the total amount of the solid content.

A filler may be dispersed in the resin layer depending on use, such as the improvement of the strength, conductivity and thermal radiation property of the resin layer. Specific examples of a material used as the tiller include metal (for example, gold, silver, copper and the like); inorganic materials, such as titanium oxide, aluminum oxide, zinc oxide, barium sulfate, aluminum borate, potassium titanate, tin oxide, calcium carbide, aluminum hydroxide, magnesium hydroxide, magnesium oxide and silica; organic materials, such as carbon black, carbon nanotubes, carbon fibers, polytetrafluoroethylene (PTFE) particles, polyethylene particles, silicone particles and spherical silicone TOSPEARLs; and the like. The amount of the filler being used is preferably, for example, from 1 volume % to 70 volume % and more preferably from 5 volume % to 50 volume % with respect to the volume of the resin.

The heating temperature and the heating time are not particularly limited as long as the crosslinking reaction proceeds, and, for example, the heating temperature may be in a range of from 50° C. to 300° C., and the heating time may be in a range of from 1 minute to 120 minutes.

A variety of materials can be used as the base material, and examples thereof include plastic materials, metal materials, non-magnetic metal materials, robber materials and the like.

As the plastic materials, plastic materials generally called engineering plastic can be used, and examples thereof include polyimide (PI), polyamide-imide (PAI), polybenzimidazole (PBI), polyetheretherketone (PEEK), polysulfone (PSU), polyehersulfone (PES), polyphenylene sulfide (PPS), polyetherimide (PEI), wholly aromatic polyester (liquid crystal polymers), and the like.

The elastic member, for which the above plastic material is used as the base material, is applied to, for example, a fixing belt and the like, which are used in an image fixing apparatus in an image forming apparatus. Meanwhile, in a case in which the elastic member is used as a fixing belt, among the above plastic materials, thermosetting polyimide, thermoplastic polyimide, polyamide-imide, polyetherimide, and the like are preferable. In addition, the elastic member, in which the plastic material is used as the base material, is applied to, for example, a fixing roll and the like, which are used in an image fixing apparatus in an image forming apparatus.

Examples of the metal materials include a variety of metals, alloy materials and the like, and examples thereof include SUS, aluminum, nickel, copper, iron, alloys thereof, and the like.

The elastic member, for which the above metal material is used as the base material, is applied to, for example, a fixing belt and the like, which are used in an image fixing apparatus in an image forming apparatus. Meanwhile, in a case in which the elastic member is used as a fixing belt, a plurality of the plastic materials or the metal materials may be laminated. In addition, the elastic member, for which the above metal material is used as the base material, is applied to, for example, a fixing roll used and the like, which are used in an image fixing apparatus in an image forming apparatus.

Examples of the non-magnetic metal materials include non-magnetic metal materials, such as gold, silver, copper, aluminum, zinc, tin, lead, bismuth, helium, antimony, and alloys thereof (alloys including the above).

The elastic member, for which the above non-magnetic metal material is used as the base material, is applied to a fixing belt and the like in an electromagnetic induction-type image fixing apparatus in an aspect in which, for example, a layer made of the non-magnetic metal material (heat generating layer) is further laminated on a layer made of the plastic material, metal material or the like (base layer), and, furthermore, inside and outside urethane resin layers (protective layers) are laminated on the heat generating layer.

Examples of the rubber material include urethane rubber, ethylenepropylene rubber (EPM), silicone rubber, fluorine rubber (FKM), and the like. Examples of the silicone rubber include WIN silicone rubber, HTV silicone rubber, and the like. Specific examples thereof include polydimethyl silicone (MQ), methyl vinyl silicone rubber (VMQ), methyl phenyl silicone rubber (PMQ), fluorosilicone rubber (FVMQ) and the like.

The elastic member, for which the above rubber material is used as the base material, is applied to a fixing belt and the like, which are used in an image fixing apparatus in an image forming apparatus, in an aspect in which, for example, a layer made of the rubber material (elastic layer) is further laminated on a layer made of the above plastic material, metal material or the like (base layer), and, furthermore, the inside and outside urethane resin layers (protective layers) are laminated.

In addition, a urethane resin laminate, for which the above rubber material is used as the base material, is applied to a fixing belt and the like, which are used in an image fixing apparatus in an image forming apparatus, in an aspect in which, for example, a layer made of the rubber material (elastic layer) is further laminated on a cylindrical core material made of the above plastic material, metal material or the like, and, furthermore, inside and outside urethane resin layers (protective layers) are laminated on the elastic layer.

In a case in which the elastic member according to the exemplary embodiment is a belt-shaped fixing belt, the base material may or may not have a joint as long as the base material has a ring shape (endless shape). In addition, the thickness of the base material is, for example, in a range of from 0.1 mm to 5 mm. A belt-shaped fixing member has a ring-shaped (endless-shaped) base material and the resin layer as a surface layer that is laminated on the surface of the base material. The thickness of the resin layer is, for example, in a range of from 5 μm to 500 μm.

In a case in which the elastic member according to the exemplary embodiment is a roll-shaped fixing roll, the base material may have a cylindrical shape. In addition, the thickness of the base material is, for example, in a range of from 1 mm to 10 mm. The roll-shaped fixing member has a cylindrical base material and the resin layer as a surface layer that is laminated on the surface of the base material. The thickness of the resin layer is, for example, in a range of from 10 μm to 300 μm.

In a case in which the elastic member according to the exemplary embodiment is a belt-shaped transcription belt, the base material may or may not have a joint as long as the base material has a ring shape (endless shape). In addition, the thickness of the base material is, for example, in a range of from 0.1 mm to 5 mm. A belt-shaped transcription member has a ring-shaped (endless-shaped) base material and the resin layer as a surface layer that is laminated on the surface of the base material. The thickness of the resin layer is, for example, in a range of from 10 μm to 300 μm.

In a case in which the transcription member according to the exemplary embodiment is a roll-shaped transcription roll, the base material may have a cylindrical shape. In addition, the thickness of the base material is, for example, in a range of from 1 mm to 10 mm. The roll-shaped transcription member has a cylindrical base material and the resin layer as a surface layer that is laminated on the surface of the base material. The thickness of the resin layer is, for example, in a range of from 10 μm to 300 μm.

The contact angle of the resin layer of the elastic member according to the exemplary embodiment at hexadecane is preferably in a range of from 30 degrees to 70 degrees, and more preferably in a range of from 35 degrees to 65 degrees. When the contact angle is less than 30 degrees, there are cases in which the mold release property cannot be maintained, and, when the contact angle exceeds 70 degrees, there are cases in which the initial mold release property cannot be obtained.

Meanwhile, the contact angle is adjusted by controlling the amount of fluorine atoms, the amount of silicon atoms, and the like, which are included in the crosslinked product.

The contact angle is measured at 20° C. using a contact angle meter (manufactured by Kyowa Interface Science Co., Ltd., model number: CA-S roll-type) and a θ/2 method.

<Process Cartridge and Image Forming Apparatus>

An image forming apparatus according to the exemplary embodiment has, for example, an image holding body (hereinafter sometimes referred to as "photoreceptor"), charging means for charging the surface of the image holding body, latent image forming means for forming a latent image (electrostatic latent image) on the surface of the image holding body, developing means for developing the latent image formed on the surface of the image holding body using a developer so as to form a toner image, transcribing means for transcribing the toner image formed on the surface of the image holding body to a recording medium, and fixing means for fixing the toner image transcribed to the recording medium to the recording medium so as to form a fixed image.

In the image forming apparatus, for example, a portion that includes the developing means may have a cartridge structure (process cartridge), which is attachable to and detachable from the image forming apparatus main body. The process cartridge is not particularly limited as long as the process cartridge has the elastic member according to the embodiment. The process cartridge has, for example, the elastic member according to the exemplary embodiment as the fixing member and the developing mean for developing the latent image formed on the image holding body using a liquid developer so as to form a toner image, and is attachable to and detachable from the image forming apparatus.

The image forming apparatus according to the exemplary embodiment has the elastic member. FIG. 1 is a schematic configuration view explaining the main parts of a tandem-type image forming apparatus having the elastic member as at least one of a fixing roll, an intermediate transcription belt and a transcription roll.

Specifically, an image forming apparatus 1 is configured to include photoreceptors 26 (electrostatic latent image holding body), charging rolls 34 that charge the surfaces of the photoreceptors 26, a laser generating apparatus 24 (electrostatic latent image forming means) that exposes the surfaces of the photoreceptors 26 so as to form an electrostatic latent image, developing devices 38 (developing means) that develop the latent image formed on the surfaces of the photoreceptors 26 using a developer, and form a toner image, an intermediate transcription belt 40 (intermediate transcribing body) to which the toner image formed using the developing devices 38 is transcribed from the photoreceptors 26, primary transcription rolls 28 (primary transcription means) that transcribe the toner image to the intermediate transcription belt 40, photoreceptor cleansing members 36 that remove toners, trash and the like attached to the photoreceptors 26, a secondary transcription roll 18 (secondary transcription means) that transcribes the toner image on the intermediate transcription belt 40 to a recording medium, and a fixing apparatus 12 (fixing means) having a fixing roll that fixes the toner image on the recording medium. The photoreceptors 26 and the primary transcription rolls 28 may be disposed immediately above the photoreceptors 26 as illustrated in FIG. 1, or may be disposed at locations deviated from the immediate above of the photoreceptors 26.

Furthermore, the configuration of the image forming apparatus 1 illustrated in FIG. 1 will be described in detail. In the image forming apparatus 1, the charging roll 34, the developing device 38, the primary transcription roll 28 disposed through the intermediate transcription belt 40, and the photoreceptor cleansing member 36 are disposed counterclockwise around the photoreceptor 26, and one set of the above members form a developing unit that corresponds to one color. In addition, each developing unit is provided with a toner cartridge 10 that complements a developer to the developing device 38, and a laser generating apparatus 24 that irradiates laser light, which corresponds to image information, to the surface of the photoreceptor 26, which is on the downstream side of the charging roll 34 (in the rotation direction of the photoreceptor 26) and on the upstream side of the developing device 38, is provided in the photoreceptor 26 in each of the developing units.

Four developing units that correspond to four colors (for example, cyan, magenta, yellow and black) are disposed in series in the horizontal direction in the image forming apparatus 1, and the intermediate transcription belt 40 is provided so as to pass through transcription areas between the photoreceptors 26 and the primary transcription rolls 28 of the four developing units. The intermediate transcription belt 40 is tightened using a support roll 14, a support roll 16 and a driving roll 30, which are sequentially provided counterclockwise on the inner surface side of the intermediate transcription belt so as to form a belt tightening apparatus 42. Meanwhile, the four primary transcription rolls are located on the downstream side of the support roll 14 (in the rotation direction of the intermediate transcription belt 40) and on the upstream side of the support roll 16. In addition, a transcription cleansing member 32 that cleanses the outer circumferential surface of the intermediate transcription belt 40 is provided on the opposite side of the driving roll 30 so as to come into contact with the driving roll 30 through the intermediate transcription belt 40.

In addition, the secondary transcription roll 18 for transcribing the toner image formed on the outer circumferential surface of the intermediate transcription belt 40 to the surface of recording paper, which is transported from a paper feeding portion 22 through a paper path 20, is provided on the opposite side of the support roll 14 through the intermediate transcription belt 40 so as to come into contact with the support roll 14.

In addition, the paper feeding portion 22 that houses the recording medium is provided at the bottom portion of the image forming apparatus 1, and the recording medium is fed from the paper feeding portion 22 through the paper path 20 so as to pass through the contact portion between the support roll 14, which configures the secondary transcription portion, and the secondary transcription roll 18. Furthermore, the recording paper that has passed through the contact portion is transported using transporting means, not shown, so as to pass through a contact portion of the fixing apparatus 12, and, ultimately, is discharged outside the image forming apparatus 1.

Next, an image forming method, in which the image forming apparatus 1 illustrated in FIG. 1, will be described. A toner image is formed at each developing unit, after the surfaces of the photoreceptors 26, which rotate in the counterclockwise direction using the charging rolls 34, are charged, a latent image (electrostatic latent image) is formed on the surfaces of the photoreceptors 26 charged using the laser generating apparatus 24 (exposing apparatus), next, the latent image is developed using a developer supplied from the developing devices 38 so as to form a toner image, and the toner image moved to the contact portions between the primary transcription rolls 28 and the photoreceptors 26 is transcribed to the outer circumferential surface of the intermediate transcription belt 40 that rotates in the C arrow direction. Meanwhile, after the transcription of the toner image, toners, trash and the like attached to the surfaces of the photoreceptors 26 are cleansed using the photoreceptor cleansing members 36, and the photoreceptors prepares for the formation of the next toner image.

The toner image developed at the developing units of the respective colors is moved to the secondary transcription portion in a state of being sequentially laminated on the outer circumferential surface of the intermediate transcription belt 40 so as to correspond to image information, and is transcribed to the surface of the recording medium transported from the paper feeding portion 22 through the paper path 20 using the secondary transcription roll 18. Furthermore, the recording medium to which the toner image has been transcribed is pressurized and heated when passing through the contact portion of the fixing apparatus 12 so as to be fixed, and is discharged outside the image forming apparatus after an image is formed on the surface of the recording medium.

EXAMPLES

Hereinafter, the invention will be described in detail using Examples and Comparative examples, but the invention is not limited to the following examples. Meanwhile, hereinafter, "parts" and "%" are mass-based unless otherwise described.

[Method for Manufacturing a Sample]

Example 1

<Formation of Resin Layer Sample A1>

A straight-chain dimethyl silicone compound having a hydroxyl group at the terminal YF3905 (manufactured by Momentive Performance materials Inc., 16 parts by mass), a branched-chain dimethyl silicone compound having a methoxy group at the terminal XC96-B0446 (manufactured by Momentive Performance materials Inc., 4 parts by mass), triethoxy-1H,1H,2H,2H-tridecafluoro-n-octylsilane, which is a fluoroalkylsilane compound, (2 parts by mass) and a catalyst CE611 (manufactured by Momentive Performance materials Inc., 0.02 parts by mass) are mixed. A coated film is formed using a liquid mixture, and cured at 200° C. for 4 hours, thereby obtaining a resin layer sample A1 (film thickness 50 μm).

Example 2

<Formation of Resin Layer Sample A2>

A dimethyl silicone compound YF3905 (manufactured by Momentive Performance materials Inc., 16 parts by mass), XC96-B0446 (manufactured by Momentive Performance materials Inc., 4 parts by mass), triethoxy-1H,1H,2H,2H-tridecafluoro-n-octylsilane (4 parts by mass) and a catalyst CE611 (manufactured by Momentive Performance materials Inc., 0.02 parts by mass) are mixed. A coated film is formed using a liquid mixture, and cured at 200° C. for 4 hours, thereby obtaining a resin layer sample A2 (film thickness 50 μm).

Example 3

<Formation of Resin Layer Sample A3>

A dimethyl silicone compound YF3905 (manufactured by Momentive Performance materials Inc., 16 parts by mass); XC96-B0446 (manufactured by Momentive Performance materials Inc., 4 parts by mass), triethoxy-1H,1H,2H,2H-tridecafluoro-n-octylsilane (6 parts by mass) and a catalyst CE611 (manufactured by Momentive Performance materials Inc., 0.02 parts by mass) are mixed. A coated film is formed using a liquid mixture, and cured at 200° C. for 4 hours, thereby obtaining a resin layer sample A3 (film thickness 50 μm).

Example 4

<Formation of Resin Layer Sample A4>

A dimethyl silicone compound YF3905 (manufactured by Momentive Performance materials Inc., 18 parts by mass), XC96-B0446 (manufactured by Momentive Performance materials Inc., 2 parts by mass), triethoxy-1H,1H,2H,2H-tridecafluoro-n-octylsilane (2 parts by mass) and a catalyst CE611 (manufactured by Momentive Performance materials Inc., 0.02 parts by mass) are mixed. A coated film is formed using a liquid mixture, and cured at 200° C. for 4 hours, thereby obtaining a resin layer sample A4 (film thickness 50 μm).

Example 5

<Formation of Resin Layer Sample A5>

A dimethyl silicone compound YF3905 (manufactured by Momentive Performance materials Inc., 14 parts by mass), XC96-B0446 (manufactured by Momentive Performance materials Inc., 6 parts by mass), triethoxy-1H,1H,2H,2H-tridecafluoro-n-octylsilane (2 parts by mass) and a catalyst CE611 (manufactured by Momentive Performance materials Inc., 0.02 parts by mass) are mixed. A coated film is formed using a liquid mixture, and cured at 200° C. for 4 hours, thereby obtaining a resin layer sample A5 (film thickness 50 μm).

Example 6

<Formation of Resin Layer Sample A622

A straight-chain dimethyl silicone compound having a vinyl group at a side chain VDT-731 (manufactured by AZmax, 10 parts by mass), a straight-chain dimethyl silicone compound having an H group at the terminal HMS-301 (manufactured by AZmax, 5 parts by mass), 2-(perfluorohexyl)ethyl acrylate, which is a fluoroalkyl acrylate compound, (1.5 parts by mass), and a platinum catalyst (0.02 parts by mass) are mixed. A coated film is formed using a liquid mixture, and cured at 150° C. for 2 hours, thereby obtaining a resin layer sample A6 (film thickness 50 μm).

Example 7

<Formation of Resin Layer Sample A7>

A straight-chain dimethyl silicone compound having a hydroxyl group at a side chain YF3905 (manufactured by Momentive Performance materials Inc., 16 parts by mass), triethoxy-1H,1H,2H,2H-tridecafluoro-n-octylsilane, which is a fluoroalkylsilane compound, (2 parts by mass) and a catalyst CE611 (manufactured by Momentive Performance materials Inc., 0.02 parts by mass) are mixed. A coated film is formed using a liquid mixture, and cured at 200° C. for 4 hours, thereby obtaining a resin layer sample A7 (film thickness 50 μm).

Example 8

<Formation of Resin Layer Sample A8>

A straight-chain dimethyl silicone compound having a vinyl group at a side chain VDT-731 (manufactured by AZmax, 10 parts by mass), 2-(perfluorohexyl)ethyl acrylate, which is a fluoroalkyl acrylate compound, (1.5 parts by mass), and a platinum catalyst (0.02 parts by mass) are mixed. A coated film is formed using a liquid mixture, and cured at 150° C. for 2 hours, thereby obtaining a resin layer sample A8 (film thickness 45 μm).

Example 9

<Formation of Resin Layer Sample A9>

A dimethyl silicone compound YF3905 (manufactured by Momentive Performance materials Inc., 14 parts by mass), XC96-B0446 (manufactured by Momentive Performance materials Inc., 6 parts by mass), triethoxy-1H,1H,2H,2H-tridecafluoro-n-octylsilane (2 parts by mass), a spherical silicone TOSPEARL (1205 parts by mass) and a catalyst CE611 (manufactured by Momentive Performance materials Inc., 0.02 parts by mass) are mixed. A coated film is formed using a liquid mixture, and cured at 200° C. for 4 hours, thereby obtaining a resin layer sample A9 (film thickness 50 μm).

Comparative Example 1

<Formation of Resin Layer Sample B1>

A fluorine rubber manufactured by Daikin Industries, Ltd., DC-1060) is subjected to press vulcanization (primary vulcanization) at 170° C. for 30 minutes so as to manufacture a rubber sheet. The rubber sheet is subjected to secondary vulcanization under conditions of 230° C. and 24 hours, thereby producing resin layer sample B1 (film thickness 50 μm).

Comparative Example 2

<Formation of Resin Layer Sample B2>

A dimethyl silicone compound haying a hydroxyl group YF3905 (manufactured by Momentive Performance materials Inc., 16 parts by mass), XC96-B0446, which is a dimethyl silicon compound having a methoxy group, (manufactured by Momentive Performance materials Inc., 4 parts by mass) and a catalyst CE611 (manufactured by Momentive Performance materials Inc., 0.02 parts by mass) are mixed. A coated film is formed using a liquid mixture, and cured at 200° C. for 4 hours, thereby obtaining a resin layer sample B2 (film thickness 50 μm).

[Evaluation]

(Measurement of the Contact Angle)

The contact angles of the resin layer samples obtained in the above Examples and Comparative examples are measured using water or hexadecane. Meanwhile, the contact angles are measured at 20° C. using a θ/2 method. The results are described in the table. Meanwhile, the contact angles are measured using a contact angle meter (manufactured by Kyowa Interface Science Co., Ltd., model number: CA-S roll-type). The results are described in Table 1.

(Mold Release Property Test)

The mold release properties of the resin layer samples are evaluated using the following method. Specifically, the resin layer sample is coated on a fixing roll (base material: aluminum) (film thickness 40 μm), the fixing roll is mounted in a fixing apparatus, and the fixing properties of non-fixed black beta images are confirmed by conveying paper. In addition, the fixing properties are confirmed after 5,000 sheets of paper are conveyed. As the fixing apparatus, a DocuCentre C2101 (manufactured by Fuji Xerox Co., Ltd.) is used. The evaluation standards are as follows, and the results are described in Table 1.

G1: the toner was attached to the entire surface of the resin layer sample.

G2: the toner was attached to half of the resin layer sample.

G3: the toner was attached to 20% of the resin layer sample.

G4: the toner was not attached to the resin layer sample.

TABLE 1

| | | Contact angle | | Mold release property | |
|---|---|---|---|---|---|
| | Resin title | Water | Hexadecane | Initial | 5000 sheets |
| Example 1 | A1 | 108 | 47 | G4 | G4 |
| Example 2 | A2 | 112 | 65 | G3 | G3 |
| Example 3 | A3 | 112 | 60 | G3 | G3 |
| Example 4 | A4 | 105 | 36 | G4 | G3 |
| Example 5 | A5 | 105 | 36 | G4 | G4 |
| Example 6 | A6 | 107 | 50 | G4 | G4 |
| Example 7 | A7 | 105 | 36 | G4 | G3 |
| Example 8 | A8 | 106 | 48 | G4 | G3 |
| Example 9 | A9 | 104 | 35 | G4 | G4 |
| Comparative example 1 | B1 | 110 | >65 | G2 | G2 |
| Comparative example 2 | B2 | 105 | 30 | G3 | G1 |

As such, the elastic members have an excellent mold release property in Examples compared to in Comparative examples. It is considered that, in Comparative example 1, since the contact angle at hexadecane is too large, the mold release property is deteriorated. In addition, it is considered that, in Comparative example 2, since the contact angle at hexadecane is too small, the mold release property is deteriorated after 5,000 sheets of paper are passed.

The foregoing description of the exemplary embodiments of the present invention has been provided for the purpose of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and there equivalents.

What is claimd is:

1. An elastic member comprising:

a surface resin layer including a crosslinked product of a dimethyl silicone compound having a reactive group and a fluoroalkyl compound having a reactive group, wherein the dimethyl silicone compound having a reactive group is a straight-chain dimethyl silicone compound having a reactive group and a branched-chain dimethyl silicone compound having a reactive group and wherein a ratio of parts by mass of the straight-chain dimethyl silicone compound to parts by mass of the branched-chain dimethyl silicone compound is in a range from 8:2 to 7:3.

2. The elastic member according to claim 1, wherein the reactive group in the dimethyl silicone compound having a reactive group is a hydroxyl group.

3. The elastic member according to claim 1, wherein the reactive group in the fluoroalkyl compound having a reactive group is an alkoxy group.

4. A fixing belt comprising:

an elastic member comprising a surface resin layer including a crosslinked product of a dimethyl silicone compound having a reactive group and a fluoroalkyl compound having a reactive group, wherein the elastic member is in a belt-shape.

5. A process cartridge comprising:

an elastic member comprising a surface resin layer including a crosslinked product of a dimethyl silicone compound having a reactive group and a fluoroalkyl compound having a reactive group.

6. An image forming apparatus comprising: an elastic member comprising a surface resin layer including a crosslinked product of a dimethyl silicone compound having a reactive group and a fluoroalkyl compound having a reactive group.

* * * * *